May 26, 1953     W. W. WERNER     2,639,459

DOOR CLOSER

Filed Feb. 27, 1950

INVENTOR.
WILLY W. WERNER

BY

ATTORNEY.

Patented May 26, 1953

2,639,459

UNITED STATES PATENT OFFICE 2,639,459

DOOR CLOSER

Willy W. Werner, Detroit, Mich.

Application February 27, 1950, Serial No. 146,567

4 Claims. (Cl. 16—65)

This invention relates to a door check and closer and, in particular, it relates to a spring actuated door check in combination with a brake lining and cam for controlling the rate of movement of the mechanism.

In brake shoes of the spring actuated type, considerable difficulty has been encountered in providing a suitable means for resisting movement of the spring so as to effect the closing of a door in a smooth and efficient manner.

I have found that a mechanism of this type may be actuated effectively by providing a cam and brake lining combination in which the cam is pivotally supported in a manner so that its engagement with the brake shoe may be effectively self-adjustable. For example, the cam is so pivoted that as the door is opened the engagement of the brake lining with the cam is such that the cam is merely pivoted about its support resulting in no restraining influence. However, as the door is being closed by means of spring action, the cams engage with the brake lining in a controlled wedging action which permits progressive and slow movement in the door closing operation.

The cams are also provided with springs for insuring engagement of the cams with the brake lining. Furthermore, the invention contemplates relief portions along the brake lining for the purpose of removing the frictional engagement of the cams with the brake lining when the door is in approximate closing position. This allows the door to be closed with additional force when in closing position so as to actuate easily the conventional latch mechanism usually associated with doors. Another provision of my invention is that the cams may be easily adjusted so as to vary the tension of the cams against the brake lining and thereby control the rate of movement of the door against the action of the spring.

It is, therefore, among the objects and advantages of my invention to provide a door check and closer of the spring actuated type which will permit a door to be opened easily but which will operate to close the door in a controlled smooth movement; to provide such a mechanism which includes a relief to permit a more positive action of the closing mechanism as the door reaches its closing position; to provide such a mechanism which is easily adjustable; to provide such a mechanism which will function effectively throughout long periods of usage; and, to provide such a mechanism which is efficient in performance and economical of manufacture.

These and other objects and advantages will appear more fully in the following detailed description when considered in connection with the accompanying drawing, in which.

Figure 1:
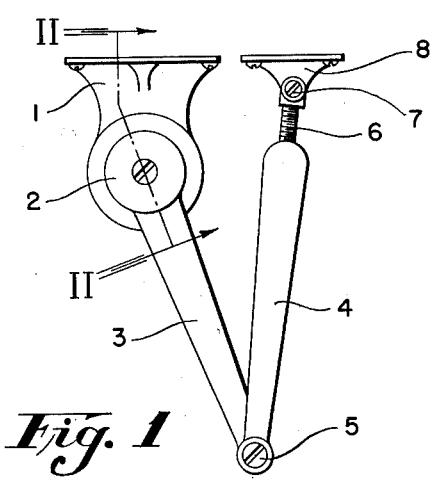
Figure 1 is a plan view of a door check and closer forming an embodiment of my invention.

With reference to the drawing and, in particular, to Figure 1, I show an embodiment of my invention constituting a door check and closer. Essentially, the embodiment comprises a bracket 1 which is ordinarily attached to the frame of a door. Supported by the bracket 1 is a housing 2 having an arm 3 extending therefrom. A lever 4 is pivoted to the arm 3 by means of a pivot screw 5. At the opposite end of the lever 4 is an adjustable link 6 pivotally attached at 7 to an angle plate 8 which, in turn, is fastened to a conventional door. The use and position of the door check and closer is similar to that of most conventional types of door checks used for the same purpose.

Figure 2:
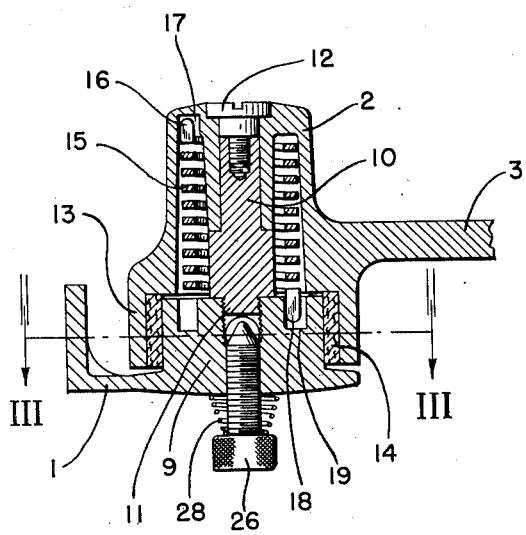
Figure 2 is a side view, in section, of the mechanism taken along lines II—II of Figure 1.

With reference to Figure 2 and extending upwardly from the bracket 1 is a cylindrical portion 9. A central pin or shaft 10 is attached to and extends upwardly from the cylindrical portion 9. This attachment is made by means of a threaded portion 11 projecting from the shaft 10 and engaging with complementary threads associated with the cylindrical portion 9. A cap screw 12 functions to attach the housing 2 with the shaft 10 thus allowing the housing 2 to move pivotally relative to the bracket 1. The lower portion of the housing 2 forms, in effect, a brake drum 13 against the inner surface of which is bonded a brake lining 14.

To provide the energy for closing the door a helical spring 15 is utilized. The spring is formed of spring steel having a rectangular cross-section. One end of the spring 15 has a bent up portion which engages in a slot 17 in the housing 2. Also, the other end of the spring is bent downward to form a portion 18 which engages a slot 19 for securing the spring. There are a plurality of slots 19 positioned in the cylindrical portion 9 so that the tension of the spring 15 may be adjusted to accommodate different conditions of usage of the door closer.

Figure 3:
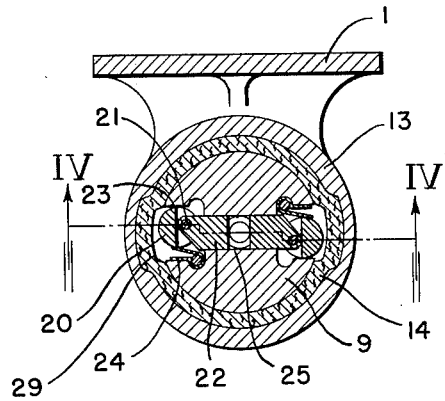
Figure 3 is a plan view, in section, of the mechanism taken along line III—III of Figure 2; and, Figure 4 is a portion of an elevational view, in section, taken along lines IV—IV of Figure 3.
Figure 4:
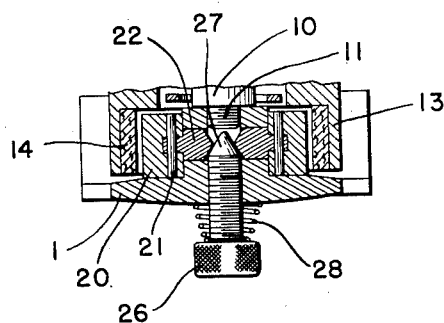

As shown in particular, in Figures 3 and 4, I provide a cam mechanism for engaging the brake lining 14. Essentially, this mechanism comprises a cam 20 positioned within a recess in the cylindrical portion 9. The cam 20 is itself a cylindrical member the curved surface of which is in engageable position relative to the brake lining 14. The cam 20 is held in position by means of a pin 21 which pivotally attaches to the cam and to a cam support 22. The pin 21 is off-center relative to the axis of the cam 20. This is essential in order to provide a binding action when the door is moving to closed position while at the same time allowing the cam to pivot freely when the door is being opened. When the cam 20 is in its binding or retarding position, it is in engagement with the brake lining and is supported in that position by being in engagement with the wall 23 of the recess formed in the cylindrical portion 9. A light flat spring 24 is also positioned within the recess within the cylindrical portion 9 and engages with the cam 20 so as to maintain the cam 20 normally in engagement with the surface 23.

The cam retainer 22 is in the form of a plug which is slidable within an aperture 25 extending laterally through the cylindrical portion 9. This cam retainer 22 is adjustable by means of a thumb screw 26 extending axially through the bracket 1. The thumb screw 26 is provided with a cone-shaped end 27 which engages with a complementary surface of the cam retainer 22. By moving the thumb screw 26 inwardly the cam 20 is moved outwardly so as to tighten its relationship with the brake lining 14. A spring 28 between the head of the screw 26 and the bracket 1 merely serves as a locking means to prevent the screw 26 from moving of its own accord.

While I have described a single cam and cam retainer and associated mechanism, a similar cam and cam retainer is positioned within the cylindrical member 9 in a diametrically opposite position. It is to be understood that the opposite cam mechanism is identical and functions similarly and simultaneously as the first mentioned cam unit.

The brake lining 14 is provided with an indented portion 29 which functions as a relief so that the cam 20 will not engage the brake lining in this region. A similar relief portion is located diametrically opposite to the relief portion designated as 29. The purpose of this relief is to disengage the cam with the brake lining when the door reaches substantially its closed position. This eliminates any frictional restraint of the mechanism and allows the force of the spring 15 without restraint to complete the closing of the door at this point.

In the operation of the door check and closing mechanism the door, when it is swung open, causes the housing 2 to pivot in relation to the brake 1, and this energizes the spring 15. During this travel of the door the cam 20 engages the brake lining 14 but merely slides easily along the surface of the brake lining because the cam pivots about the pin 21. When the door begins its closing movement the cam 20 cannot pivot about the pin 21 because of the reverse frictional movement of the brake lining against the cam surface which forces the cam against the wall 23. As a result, a uniform pressure is exerted by the cam against the brake lining constituting a frictional engagement to cause the door to move slowly against the action of the spring 15.

The brake lining is formed of leather and, as such, it possesses a yielding reaction with the cam 20 to permit a smooth and effective restraint in the action of the door closing operation. It is to be noted that the diameter of the cam is relatively small in relation to the diameter of the brake lining. It is this feature constituting a relatively small area of contact between the cam 20 and the brake lining which permits an accurate control on the degree of restraint effected in the closing operation. The thumb screw 26 enables the cams to be set in a most favorable tensioning position.

While I have described a preferred embodiment of my invention, it is to be understood that it may be otherwise embodied within the spirit of the invention and as appearing in the scope of the appended claims.

Having thus described my invention, what I claim and desire to protect by Letters Patent is:

1. A brake means for a door check mechanism comprising, a brake drum, a brake lining attached to the inner peripheral surface of the brake drum, a rotatable member within said brake drum and rotatable relative thereto, a helical spring having one end attached to the drum and the other end attached to said rotatable member, a pair of cylindrical members in diametrically opposite positions carried by said rotatable member and within said brake drum, a supporting member pivotally attached to each of said cylindrical members, the axes of said cylindrical members lying parallel to the axis of said brake drum and the pivotal attachment between said cylindrical members and said supporting members being off-center relative to the geometrical axes of the cylindrical members, and means for adjusting the supporting members toward or away from said brake lining.

2. A brake means for a door check mechanism comprising, a brake drum, a brake lining attached to the inner peripheral surface of the brake drum, a rotatable member within said brake drum and rotatable relative thereto, a helical spring having one end attached to the drum and the other end attached to said rotatable member, a pair of cylindrical members in diametrically opposite positions carried by said rotatable member and within said brake drum, a supporting member pivotally attached to each of said cylindrical members, the axes of said cylindrical members lying parallel to the axis of said brake drum and the pivotal attachment between said cylindrical members and said supporting members being off-center relative to the geometrical axes of the cylindrical members, a light spring for engaging and maintaining the cylindrical members in contact with the brake lining, and means for adjusting the supporting members toward or away from said brake lining.

3. A brake means for a door check mechanism comprising, a brake drum, a brake lining attached to the inner peripheral surface of the brake drum, a rotatable member within said brake drum and rotatable relative thereto, a helical spring having one end attached to the drum and the other end attached to said rotatable member, a pair of cylindrical members in diametrically opposite positions carried by said rotatable member and within said brake drum, a supporting member pivotally attached to each of said cylindrical members, the axes of said cylindrical members lying parallel to the axis of said brake drum and the pivotal attachment between said cylindrical members and said supporting members being off-center relative to the geometrical axes of the cylindrical members, a wall forming a portion of the rotatable member forming a stop for limiting movement of a cylindrical member against the action of the spring, and means for adjusting the supporting members toward or away from said brake lining.

4. A brake means for a door check mechanism comprising, a brake drum, a brake lining attached to the inner peripheral surface of the brake drum, a rotatable member within said brake drum and rotatable relative thereto, a helical spring having one end attached to the drum and the other end attached to said rotatable member, a pair of oppositely disposed radially movable supports carried by said rotatable member, a cam pivotally supported at the outer ends of said supports, said pivotal connections being off-center relative to the body of said cam members, a member between said supports for adjustably positioning said supports radially of said rotatable member, and resilient means between said rotatable member and said cams for urging said cams in contact with said brake lining.

WILLY W. WERNER.

References Cited in the file of this patent

UNITED STATES PATENTS

| Number | Name | Date |
|---|---|---|
| 1,671,614 | Smith | May 29, 1928 |
| 1,963,466 | Jury | June 19, 1934 |
| 2,328,851 | Schackleton et al. | Sept. 7, 1948 |

FOREIGN PATENTS

| Number | Country | Date |
|---|---|---|
| 325,288 | Germany | Sept. 11, 1920 |